United States Patent
Fich et al.

(10) Patent No.: US 7,424,833 B2
(45) Date of Patent: Sep. 16, 2008

(54) TELESCOPICALLY MOVING STRUCTURE

(75) Inventors: Preben Bo Fich, Kent (GB); Christian Noergaard, Kent (GB)

(73) Assignee: IDE Associates (IOM) Limited, Douglass (GB)

( * ) Notice: Subject to any disclaimer, the term of this patent is extended or adjusted under 35 U.S.C. 154(b) by 572 days.

(21) Appl. No.: 10/296,151

(22) PCT Filed: May 22, 2001

(86) PCT No.: PCT/DK01/00351

§ 371 (c)(1),
(2), (4) Date: Mar. 31, 2004

(87) PCT Pub. No.: WO01/89981

PCT Pub. Date: Nov. 29, 2001

(65) Prior Publication Data

US 2004/0211275 A1    Oct. 28, 2004

(30) Foreign Application Priority Data

May 22, 2000   (DK) ............................... 2000 00815
Oct. 3, 2000   (DK) ............................... 2000 01467

(51) Int. Cl.
*F16H 25/22*   (2006.01)
*A47B 9/04*    (2006.01)

(52) U.S. Cl. ................. 74/89.35; 74/89.23; 108/147.19

(58) Field of Classification Search ................. 74/89.23, 74/89.35; 464/165, 167; 384/58; 108/147, 108/147.19

See application file for complete search history.

(56) References Cited

U.S. PATENT DOCUMENTS 2,819,134 A * 1/1958 Klevholm ................... 108/147
3,099,917 A * 8/1963 Spiri ........................... 464/165
3,404,580 A * 10/1968 Valenti ....................... 74/89.35

FOREIGN PATENT DOCUMENTS

JP          2001012171    *  1/2001

* cited by examiner

*Primary Examiner*—William C Joyce
(74) *Attorney, Agent, or Firm*—Browdy and Neimark

(57) ABSTRACT

A telescopically moving structure (1) comprising a nut (2) mounted in a rotationally fixed manner in relation to a frame part, a spindle tube (3) with an external thread in engagement with the nut (2), which spindle tube (3) furthermore has an internal thread (4) with the opposite direction to that of the external thread, which internal thread (4) is in engagement with a non-rotational spindle (5) provided with an external thread, the spindle tube (3) being connected in a rotationally fixed manner, but in the axial direction in a slidable manner to a driving shaft (6), wherein the driving shaft (6) has an essentially polygonal cross section with a perimeter forming two opposite longitudinal tracks for engagement with torque-transferring rolling bodies which are journalled in a bushing fastened in the spindle tube (3) to thereby enable transfer of a large torque without the risk of seizure between the driving shaft (6) and the spindle tube (3).

9 Claims, 3 Drawing Sheets

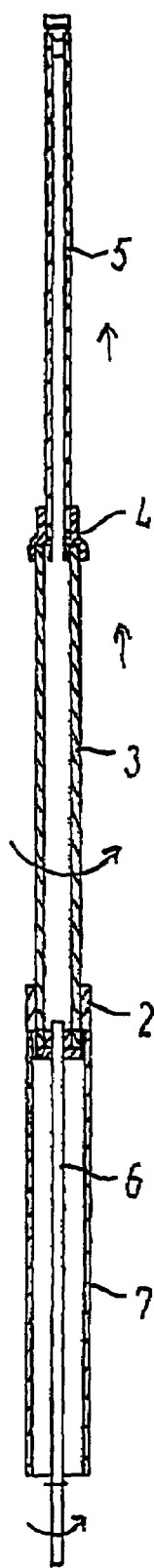
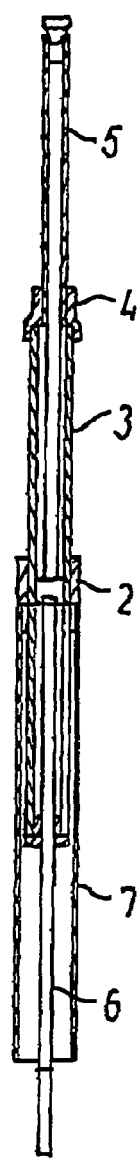
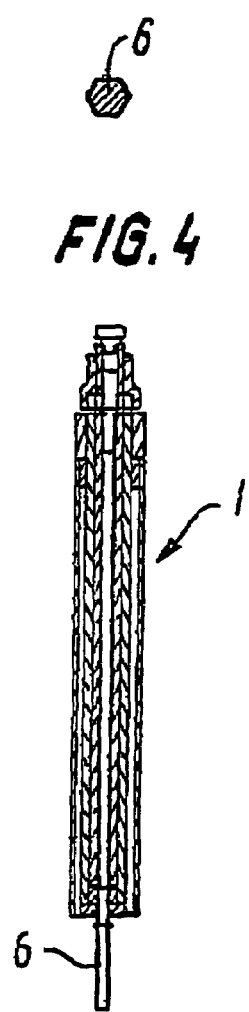
FIG.1    FIG.2    FIG.3

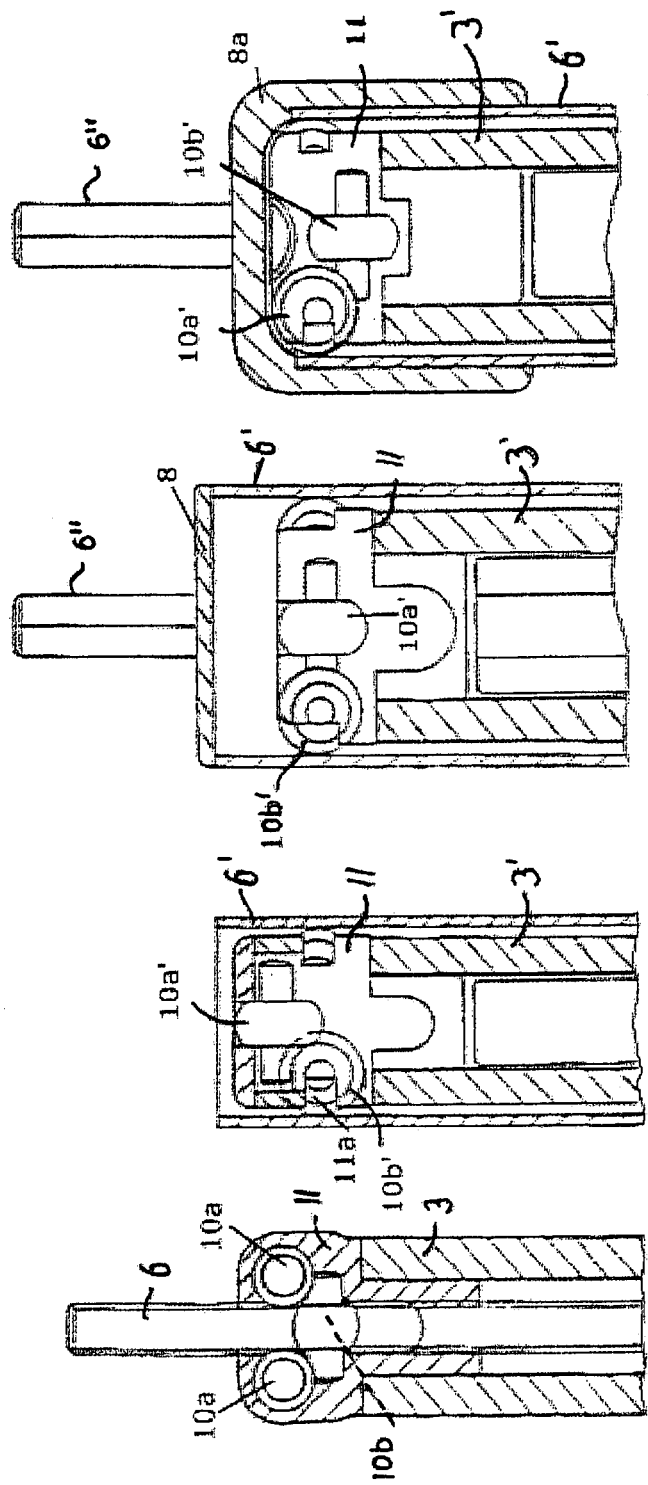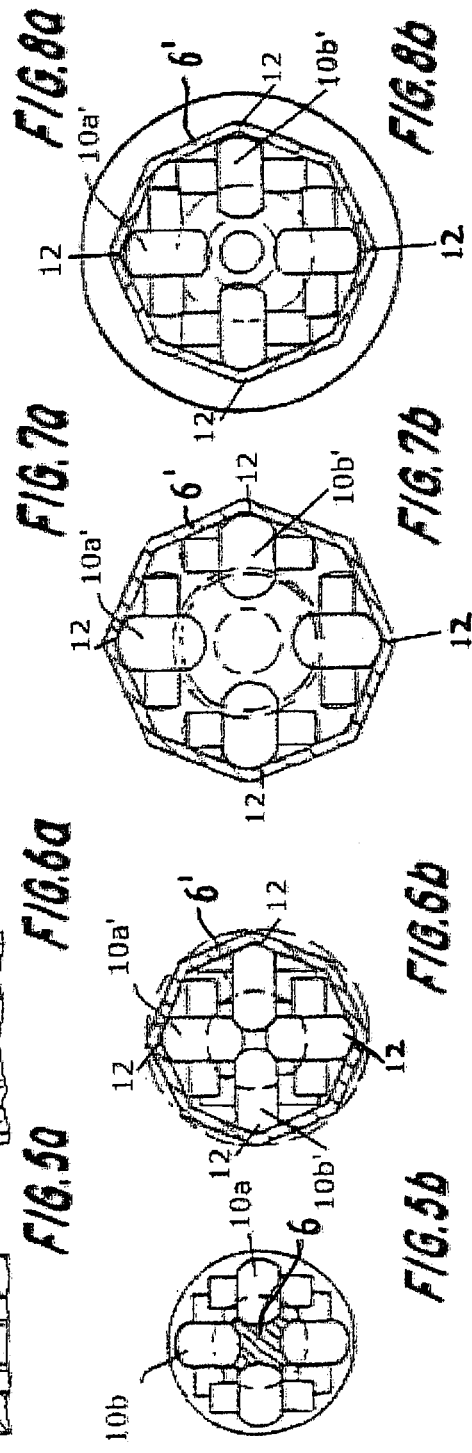

TELESCOPICALLY MOVING STRUCTURE

BACKGROUND OF THE INVENTION

1. Technical Field of the Invention

The present invention relates to a telescopically moving structure comprising a nut mounted in a rotationally fixed manner in relation to a frame part, a spindle tube with an eternal thread in engagement with the nut, which spindle tube furthermore has an internal thread with the opposite direction to that of the external thread, which internal thread is in engagement with a non-rotational spindle provided with an external thread, the spindle tube being connected in a rotationally fixed manner, but in the axial direction in a slidable manner to a driving shaft.

2. Prior Art

Telescopically moving structures of this kind have an increasing importance as demands for compact and versatile telescopic structures are growing. Structures of said kind can, as will appear later, be telescoped to essentially the triple length, which makes them very suitable for e.g. height-adjustment of tables, however, they are used in several connections.

For many purposes it is necessary or at least preferable that the means for rotation of the spindle tube, and thus for providing the telescopic movement, are situated at one end of the structure, and that the means for rotation of the spindle tube are stationary in relation to this end of the spindle tube. Further it is an advantage that the means for rotation of the spindle tube in the axial direction are connected in a slidable manner to the tube such that a load in the axial direction is not transferred to the driving mechanism. This means that gearwheels etc. do not have to be dimensioned in order to stand a blow in axial direction. If, for example, a height-adjustable table during transport or the like is dropped from a few centimeters, the driving mechanism can easily be damaged, if this axial force is transmitted to gear wheels or the like. Therefor height-adjustable tables must be dimensioned to withstand a fall according to a so-called drop-test, but a telescopically moving structure connected in a slidable manner to the drive system merely has to be dimensioned to endure the forces at retracting or telescoping the structure, which means, for example, that the structure can be designed with nylon gearwheels which are much cheaper than steel gearwheel.

U.S. Pat. No. 3,404,580 discloses an actuator in which a first threaded spindle tube is driven to rotate by a splined shaft slidably engaged in a splined hole in one end of the spindle tube. The spindle tube is engaged in a nonrotary nut, and a second, nonrotary spindle tube is threadably engaged in an internal thread of the first spindle tube, the internal and external threadings of the first spindle tube being of different directions.

A disadvantage of this actuator is that the spindle tube is driven by a small diameter splined shaft, which will not be able to transfer high torque because this may result in seizure so the splined shaft cannot slide in the splined hole.

Similarly DE 39 10 814 A1 discloses a linear actuator in which a first, threaded spindle tube is driven to rotate by a splined shaft slidably engaged in a splined hole in one end of the spindle tube. The spindle tube is engaged in a nonrotary nut, and a second, nonrotary spindle tube is threadably engaged in an internal thread of the first spindle tube, the internal and external threadings of the first spindle tube being of different directions.

A disadvantage of this actuator is that a splined shaft of small diameter will not be able to transfer high torque, because this may result in seizure so the splined shaft cannot slide in the splined hole.

U.S. Pat. No. 1,708,450 discloses a dental chair having an adjustable support in which a first spindle tube is driven to rotate, so a nonrotary nut engaged thereon translates along the spindle tube. A nonrotary spindle is engaged in an internal thread of the first spindle, and a system of rollers prevents the different nonrotary parts from rotating.

A disadvantage of this construction is that it is rather complicated and has large dimensions, so it is not suitable for being used as a telescopically moving structure in general, and further the drive means is not slidably connected to the spindle.

OBJECT AND SUMMARY OF THE INVENTION

It is an object of the present invention to provide a telescopically moving structure of the above mentioned type, which is able to work even against a strong force, i.e. is able to transfer a large torque.

The telescopically moving structure according to the invention is characterized in that the driving shaft has an essentially polygonal cross section with a perimeter forming two opposite longitudinal tracks for engagement with torque-transferring rolling bodies which are journalled in a bushing fastened in the spindle tube. With transfer of the torque from the driving shaft to a bushing inserted in the spindle tube by means of opposite longitudinal tracks for engagement with torque-transferring rolling bodies, the axial friction will be minimized, and the structure can therefore be used for movement of relatively heavy objects without risk of seizure.

According to an embodiment of the telescopically moving structure is characterized in that the driving shaft has an essentially rhombic cross section and is in engagement with rolling bodies in the form of two sets of rollers arranged in pairs one opposite the other, where the two sets are mutually displaced in the longitudinal direction of the spindle. Due to the axial displacement of the roller pairs, this design is so compact that it is suitable for placement in the interior of the spindle tube.

An alternative embodiment of the telescopically moving structure according to the invention is characterized in that the driving shaft is designed as a polygonal tube freely surrounding the spindle tube, and where said tracks are formed by corners between internal adjacent sides. This design of the driving shaft enables transfer of a large torque as the diameter of the diving shaft is considerably enlarged, the force necessary to rotate the spindle therefor being considerably reduced. The tubular driving shaft can thus be designed with relatively thin walls, and the rollers and their bearings will be correspondingly simplified.

A further embodiment of the telescopically moving structure is characterized in that the rolling bodies are provided by ball or roller bearings, preferably deep groove ball bearings, which assure both a low friction and a sufficient wearing resistance.

An embodiment of the telescopically moving structure is characterized in that said tracks are provided with a flat bottom and sides extending perpendicularly to the bottom and a width which is a little larger than the diameter of a ball bearing fastened to a radially extending axle journal on said bushing.

The main parts making up the telescopically moving structure, i.e. the spindle tube, the spindle and nuts may be ordinary threaded parts, but preferably one or more of these parts are produced by hydroforming i.e. deforming a tube in a mould by a fluid under pressure. An actuator using elements manufactured by hydroforming is disclosed in WO 98/25051 A1. Although the cost of a device for manufacturing the parts by hydroforming is very high, this method is very cost effective when large quantities are produced as the cost per unit is very low compared to ordinary threaded spindles. Further the wave-shape of the walls forming rounded tracks or threads producible by hydroforming is very well suited for transfer of large torques without risk of jamming of the parts, so spindles having a high pitch can be used. This means that the structure can be driven from retracted to extended state in very few revolutions of the driving shaft, so noise related hereto and wear of the spindles will be minimized. With hydroforming it is possible to produce a telescopically, moving structure of very small diameter as with this manufacturing process it is possible to produce spindles having a very small the thickness of the walls without sacrifice of strength. In fact a spindle having a 10 mm diameter and a wall thickness of 1 mm will be stronger than a corresponding massive rod because of the shape of the wall, i.e. corrugations or rounded tracks in the wall. Still a further advantage is that it is possible to produce spindles having changing cross section along the length, for example having integral "nuts" in the end of the spindle and/or formed with longitudinal tracks for rollers.

Furthermore, the invention relates to usage of a telescopically moving structure of the above type as a driving means in a height-adjustable table with tripartite telescopic legs, the elements of which are telescoped evenly when raising the table, and where the driving force to the driving means is supplied in the area immediately under the tabletop. The fact is that this structure is particularly suitable to be built in a height-adjustable table, the driving means being positioned in a fixed position in the axial direction, which both provides a liberty of choice regarding the size of the motor as the motor need not be built in e.g. a table leg, and, at the same time, the driving means are arranged at one end of the structure, which permits to drive the telescopically moving structure over gearwheels or alike from a centrally situated driving arrangement, which may drive more telescopically moving structures.

Furthermore, the invention has the advantage that the even telescoping of the elements assures the largest possible stability of the structure in a partially telescoped condition, all elements being inserted approximately evenly in its adjacent element or elements.

BRIEF DESCRIPTION OF THE DRAWINGS

In the following, the invention is explained in more detail with reference to the accompanying drawing, in which FIG. 1 shows a telescopically moving structure according to the invention where the structure is fully telescoped, FIG. 2 the structure according to FIG. 1 in a partially assembled condition, FIG. 3 the structure according to FIG. 1 in a completely assembled condition, FIG. 4 is an enlarged cross section of a driving shaft in a first embodiment, and FIGS. 5a and 5b show axial and cross section, respectively, of an engagement between the driving shaft and a bushing of a spindle tube, FIGS. 6a and 6b show axial and cross section, respectively, of an alternative embodiment of engagement between a driving shaft and a bushing of the spindle tube, FIGS. 7a and 7b show axial and cross section, respectively, of an alternative embodiment of engagement between the driving shaft and a bushing of the spindle tube, FIGS. 8a and 8b show axial and cross section, respectively, of an alternative embodiment of engagement between the driving shaft and a bushing of the spindle tube.

DETAILED DESCRIPTION OF THE PREFERRED EMBODIMENT(S) OF THE INVENTION

Figure 9A:
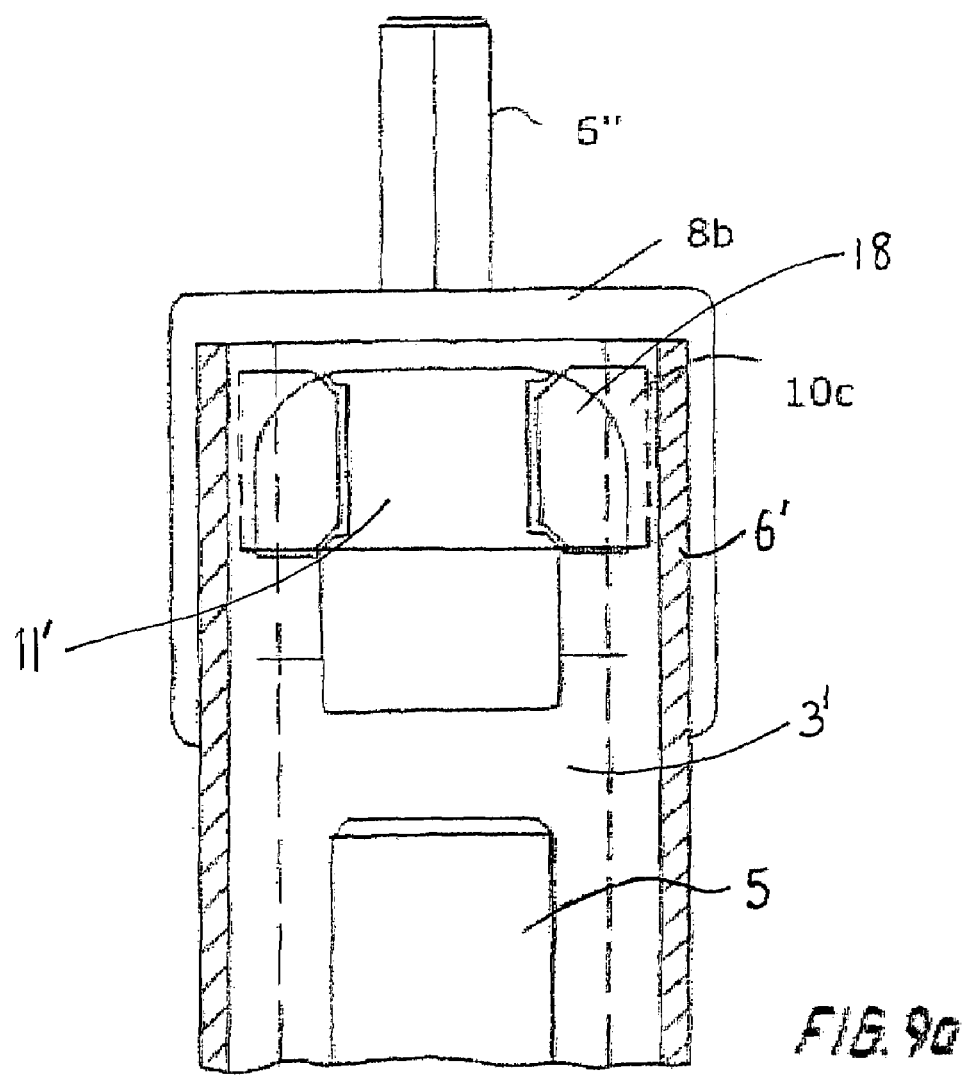
FIGS. 9a and 9b show axial and cross section, respectively, of an alternative embodiment of engagement between the driving shaft and a bushing of the spindle tube.

The telescopically moving structure 1 comprises a spindle tube 3 with an external thread engaging a nut 2 mounted in a rotationally fixed manner. The spindle tube 3 can be turned with respect to the nut 2 by means of a drive shaft 6 connected with one end of the spindle tube 3 to be rotationally fixed with respect to the spindle tube, while allowing slidable displacement thereof in the axial direction. Thus, by rotation of the drive shaft 6 the spindle tube 3 will move linearly in the axial direction with respect to the nut 2. The spindle tube 3 is further provided with an internal thread 4 of opposite direction of inclination to that of the external thread, said internal thread 4 being engaged by a corresponding external thread on a non-rotating spindle 5 such that at the rotation of the spindle tube 3 the spindle 5 is displaced in the same axial direction as the spindle tube 3. The internal thread 4 can as shown be provided by a collar or nut mounted in a rotationally fixed manner to the spindle tube 3. Alternatively, the entire spindle tube 3 or a portion hereof can be provided with an internal thread.

In this way, the structure can transform a rotational movement of the drive shaft 6 into a linear movement of spindle tube 3 and spindle 5 with respect to nut 2 as indicated by arrows in FIG. 1.

From FIGS. 1 and 3 appears that the length of the structure 1 can change essentially by a factor three. When the structure is collapsed the spindle 5 is received in the spindle tube 3, which again is received in a rotationally fixed tubular element 7, with which the nut 2 is connected. The element 7 can have an internal thread in engagement with the spindle tube 3. This need not be the case, however, and the element 7 can be of any design and form part of a frame structure, and the element 7 may further function as a guidance for the spindle tube 3 during collapsing and telescoping.

A telescopically moving structure 1 of this type is particularly suitable for e.g. height-adjustable tables or the like, the structure 1 being activated for extension and collapse by rotation of the drive shaft 6 arranged at one end of the structure 1, in particular because the drive shaft 6, 6' does not move in the axial direction.

In order to obtain a telescopically moving structure 1, which even under load can be driven by a relatively small force, it may be advantageous for the nuts 2 and 4 to be of the kind having circulating balls. It will be appropriate, however, that the threads have a certain friction or locking, such that the structure 1 is not retracted or telescoped when subject to a load in the axial direction. Another way of reducing friction between the elements is by using low friction materials for the nuts 2, 4, and/or coating the threads of the spindles 3, 3', 5 with a low friction material.

An important aspect of the telescopically moving structure 1 according to the invention is to minimize the axial friction between the driving shaft 6, 6' and the spindle tube 3, 3'. Various designs of means for reduction of this friction are shown schematically in FIGS. 5-8. In the embodiment shown in FIGS. 5a and 5b, the drive shaft 6 has a cross section corresponding substantially to a diamond. Two sets of rollers 10a and 10b arranged in pairs one opposite the other are journalled in a bushing 11, which is inserted in the spindle tube 3. The two sets of rollers 10a and 10b are displaced axially with respect to the longitudinal direction of the spindle tube 3, whereby the diameter of the bushing 11 can be reduced so much that the bushing 11 can be accommodated in the tubular element(not shown in FIGS. 5a and 5b).

Further the spindle tube 3 may be journalled in an axial thrust bearing (not shown) in the nut 4 to minimize friction and wear of the structure.

Figure 9B:
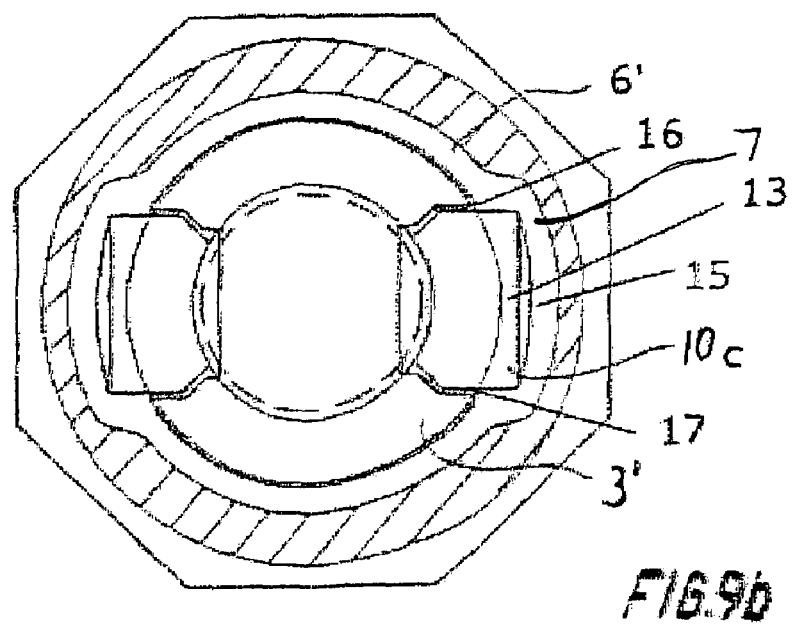

In the embodiments shown in FIGS. 6, 7 and 8, the drive shaft 6' is designed as a tube surrounding the spindle tube 3', but placed inside the fixed tubular element (not shown). The drive shaft 6' has as shown in FIGS. 6b, 7b and 8b a polygonal cross section in the form of an octagon. Four of the edges of the octagonal cross section form tracks 12 in which opposite roller pairs 10a' and 10b' can run and thus transfer a torque to the bushing 11 on which the rollers of pairs 10a' and 10b' are journalled. The octagonal form constitutes a compromise permitting a secure guidance of the roller pairs 10a' and 10b' and limited space requirements between the fixed tubular element and the spindle tube 3'. However, the other designs of the tubular driving shaft 6' are possible within the scope of the invention, if only an appropriate longitudinal track is assured for the rollers of pairs 10a' and 10b' to follow. In the embodiments with the tubular shaft 6', the bearing of the rollers of pairs 10a' and 10b' is particularly simple as they merely rest in grooves 11a in the bushing 11. As shown in FIGS. 7a, 8a and 9, the tubular shaft 6' is at one end provided with a closure 8, 8a or 8b, respectively, in the centre of which a hexagonal shaft 6" is mounted and forms a part of the connection to a not-shown drive motor or transmission. An embodiment having only one pair of rollers 10c is shown in FIGS. 9a and 9b. The rollers 10c travel in a track 13 in the drive shaft 6'.

In a special embodiment as shown in FIGS. 9a and 9b, the rollers 10c are designed as deep groove ball bearings positioned on a bushing 11' in a spindle tube 3'. The ball bearings abut on the bottom of a relatively flat track 13 in the tubular drive shaft 6' as they rest at the side face against the bottom 15 of the track 13. The outer ring of the ball bearing rolls along one or the other side 16, 17 of the track 13, depending on which direction the tubular shaft 6' is to drive the spindle tube 3'. The ball bearing is mounted on a bearing journal 18 directed perpendicular to the axis of the spindle tube 3' and axially out from this.

As mentioned earlier the spindles may be ordinary threaded spindles, but advantageously the threads of the spindles are manufactured by hydroforming, i.e. deforming a tube in a mould by a fluid under pressure. The cost of a device for manufacturing the elements by hydroforming is very high, but this method is very cost effective when large quantities are produced as the cost per unit is very low compared to ordinary threaded spindles. Further the wave-shape of the walls forming rounded tracks or threads producible by hydroforming is very well suited for transfer of large torques without risk of jamming of the parts, so spindles having a high pitch can be used. This means that the structure can be driven from retracted to extended state in very few revolutions of the driving shaft, so noise related hereto and wear of the spindles will be minimized. With hydroforming it is possible to produce a telescopically roving structure of very small diameter as with this manufacturing process it is possible to produce spindles having a very small the thickness of the walls without sacrifice of strength. In fact a spindle having a 10 mm diameter and a wall thickness of 1 mm will be stronger than a corresponding massive rod because of the shape of the wall, i.e. corrugations or rounded tracks in the wall. Still a further advantage is that it is possible to produce spindles having changing cross section along the length, for example having integral "nuts" in the end of the spindle and/or formed with longitudinal tracks for rollers. This means that the telescopically moving structure can be produced with few parts and with parts having a very small diameter making them ideal for build-in.

The invention claimed is:

1. A telescopically moving structure comprising a nut connected in a rotationally fixed manner with respect to a frame part, a spindle tube having an external thread in engagement with said nut and an internal thread with a direction of inclination opposite to that of said external thread, a non-rotational spindle having an external thread in engagement with the internal thread of said spindle tube, a drive shaft connected with said spindle tube in a manner such that the spindle tube is rotationally fixed, but slidable in an axial direction with respect to said drive shaft,
   wherein the improvement comprises two pairs of longitudinal tracks formed in the drive shaft;
   wherein each of said pairs of tracks is located on opposite sides of the drive shaft;
   wherein said spindle tube has a bushing fastened thereto, and wherein torque-transferring rolling bodies are journalled in said bushing to respectively engage within said longitudinal tracks in said drive shaft.

2. A telescopically moving structure according to claim 1, wherein the rollers of each pair are arranged opposite each other and said pairs of rollers are displaced with respect to each other in a longitudinal direction of said spindle.

3. A telescopically moving structure according to claim 1, wherein said drive shaft has a substantially octagonal cross section, said tracks being formed in corners between internal adjacent sides of said drive shaft.

4. A telescopically moving structure according to claim 1, wherein said rolling bodies are in the form of a ball or a roller bearing having flat sides.

5. A telescopically moving structure according to claim 4, wherein said ball or roller bearings comprise deep groove balls or roller bearings.

6. A telescopically moving structure according to claim 1, wherein each of said tracks is substantially flat and has a bottom for abutment of a ball or roller bearing, each track being formed with one side and another side for rolling engagement with an outer ring of the ball or roller bearing for one and the other direction of relative movement between the spindle tube and the drive shaft, respectively.

7. A telescopically moving structure according to claim 1, wherein one or more of said spindle tube, said spindle and said drive shaft are made by hydroforming.

8. A telescopically moving structure according to claim 1, wherein said drive shaft is a hollow tubular shaft spaced apart from and surrounding said spindle tube.

9. A height-adjustable table having a tabletop and a number of legs each comprising three telescopically movable parts, said legs including a telescopically moving structure comprising a nut connected in a rotationally fixed manner with respect to a frame part, a spindle tube having an external thread in engagement with said nut and an internal thread with a direction of inclination opposite to that of said external thread, a non-rotational spindle having an external thread in engagement with the internal thread of said spindle tube, a drive shaft connected with said spindle tube in a manner such that the spindle tube is rotationally fixed, but slidable in an axial direction with respect to said drive shaft, said drive shaft having a perimeter forming two opposite longitudinal tracks and said spindle tube having a bushing fastened thereto, torque-transferring rolling bodies being journalled in said bushing to engage said opposite longitudinal tracks in said drive shaft, and drive means for said drive shaft providing a driving force supplied in an area immediately below said tabletop.

* * * * *